United States Patent
Choi et al.

(10) Patent No.: US 6,858,269 B2
(45) Date of Patent: Feb. 22, 2005

(54) PHOTO-ALIGNMENT MATERIALS FOR LIQUID CRYSTAL ALIGNMENT FILM

(75) Inventors: Hwan Jae Choi, Daejun-Shi (KR); Jong Lae Kim, Seoul (KR); Eun Kyung Lee, Seoul (KR); Joo Young Kim, Daejun-Shi (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 76 days.

(21) Appl. No.: 10/207,380

(22) Filed: Jul. 30, 2002

(65) Prior Publication Data

US 2003/0118752 A1 Jun. 26, 2003

(30) Foreign Application Priority Data

Jul. 31, 2001 (KR) ........................................ 2001-46313

(51) Int. Cl.⁷ .............................................. C09K 19/00
(52) U.S. Cl. ...................................... 428/1.2; 428/1.25
(58) Field of Search ........................... 428/1.1, 1.2, 1.25

(56) References Cited

U.S. PATENT DOCUMENTS

| | | | |
|---|---|---|---|
| 5,464,669 A | | 11/1995 | Kang et al. |
| 5,539,074 A | | 7/1996 | Herr et al. ................. 526/326 |
| 5,644,016 A | * | 7/1997 | Roschert et al. ............ 528/170 |
| 5,645,901 A | * | 7/1997 | Fukuchi et al. ............. 428/1.4 |
| 6,048,928 A | * | 4/2000 | Yu et al. ..................... 525/35 |
| 6,090,909 A | * | 7/2000 | Kato et al. .................. 528/353 |
| 6,150,431 A | * | 11/2000 | Miller et al. ................ 522/167 |
| 6,218,501 B1 | * | 4/2001 | Choi et al. .................. 528/170 |
| 6,569,972 B1 | * | 5/2003 | Choi et al. .................. 526/262 |

FOREIGN PATENT DOCUMENTS

| | | | |
|---|---|---|---|
| JP | 2000281724 | | 10/2000 |
| KR | 2000-0008633 | | 2/2000 |
| WO | 01/38931 | * | 5/2001 ........... G02F/1/337 |

OTHER PUBLICATIONS

Ekisho, vol. 3, No. 4, Cover & pp. 266–267, (1999).
Schadt, M., et al., "Surface–Induced Parallel Alignment of Liquic Crystals by Linearly Polymerized Photopolymers", Jpn. J. Appl. Phys., vol. 31, 2155–2164, (1992).
Dyaduysha, Andrey, et al., "Peculiarity of an Oblique Liquid Crystal Alignment Induced by a Photosensitive Orientant", Jpn. J. Appl. Phys., vol. 34, L1000–1002, (1995).

* cited by examiner

Primary Examiner—Shean C. Wu
Assistant Examiner—Jennifer R. Sadula
(74) Attorney, Agent, or Firm—Lee & Sterba, P.C.

(57) ABSTRACT

A photo-alignment material useful in liquid crystal alignment films comprises a maleimide-based repeating unit, or a maleimide-based repeating unit and at least one additional repeating unit. The photo-alignment materials of the invention may be used in liquid crystal display devices to improve the electrical and electrooptical properties of the alignment film, and thereby improve the reliability of products using the alignment films.

6 Claims, No Drawings

PHOTO-ALIGNMENT MATERIALS FOR LIQUID CRYSTAL ALIGNMENT FILM

BACKGROUND OF THE INVENTION

1. Field of the Invention

The present invention relates to photo-alignment materials useful in liquid crystal alignment films. More particularly, the present invention relates to photo-alignment materials useful in liquid crystal alignment films that include a uniform alignment of liquid crystals. The materials of the invention can be used in a liquid crystal display device to improve electrical and electrooptical properties of the alignment film and thus improve the reliability of products using the alignment film.

2. Description of the Related Art

The arrangement of liquid crystals in a liquid crystal display device changes in accordance with an electric field induced by an externally applied voltage. Such changes in the alignment of the liquid crystals determine whether external light entering the liquid crystal device is blocked or transmitted. Thus, the liquid crystal device can be driven by this property of the liquid crystals. The quality of a liquid crystal display device as a display device is determined by properties that are varied according to the alignment state of the liquid crystals, including light transmittance, response time, viewing angle, contrast ratio, and the like. Therefore, it is very important to uniformly control the liquid crystal alignment in liquid crystal devices.

An alignment film typically refers to a layer of polymer material, which is formed between liquid crystals, and a transparent conductive film made of indium tin oxide in order to produce the uniform alignment, i.e. orientation of liquid crystalline molecules. After formation, the polymer layer typically is subjected to a mechanical process, such as rubbing and the like, and other processes to control the alignment of liquid crystals.

The method currently used to achieve uniform alignment of liquid crystals or to orient liquid crystals in a given direction in preparing liquid crystal display devices involves disposing a layer of polymer, such as polyimide, on a transparent conductive glass substrate, and rubbing the polymer surface at a high speed with a rotating roller that is wrapped with a rubbing cloth made of nylon or rayon. By this rubbing process, the liquid crystalline molecules are oriented with a specific pretilt angle on the surface of the alignment film.

Since this rubbing process is substantially the only method to orient liquid crystals easily and stably, most manufacturers producing liquid crystal display devices generally use the rubbing process for mass-production. However, the rubbing process has problems in that it creates scratches on the surface of the liquid crystal alignment film due to mechanical rubbing, and it generates static electricity which leads to destruction of thin film transistors. In addition, micro fibers released from the rubbing cloth may cause defects in the liquid crystal devices. Accordingly, this rubbing process reduces the production quality of the devices. A new alignment technique therefore has been proposed that aligns liquid crystals by irradiation of light, for example, UV rays, in order to overcome the problems involved in the rubbing process as described above and thereby to improve productivity.

Recently, liquid crystal displays have become large-scale, and the applications of the liquid crystal display are expanding beyond personal applications, such as notebook computers, to household applications such as wall-mounted TVs. In accordance with this trend, a high quality picture and a wide viewing angle are required for the liquid crystal display devices. Also, in order to meet such demands for qualities of the liquid crystal display, the photo-alignment method is currently in the spotlight.

However, the photo-alignment methods reported by M. Schadt et al. (Jpn. J. Appl. Phys., Vol. 31, 1992, 2155), Dae S. Kang et al. (U.S. Pat. No. 5,464,669), and Yuriy Reznikov (Jpn. J. Appl. Phys., Vol. 34, 1992, L1000) are not yet commercialized, in spite of the superiority of its concept, because there is difficulty in developing novel materials to support these methods. One of the major reasons for the difficulty is that raw materials of the alignment film are not sufficiently processible to be applied to the conventional method for manufacturing liquid crystal display devices. Also, the display device using the alignment film formed by photo-alignment is inferior in display quality, as compared to the display device formed using an alignment film of polyimide by rubbing process.

The present inventors have suggested a photo-alignment materials having side chains bearing cinnamate groups attached to the base homopolymer or copolymer chain of maleimide. However, in practice, there is still required an improvement in electrical properties and electrooptical properties of the alignment materials to be applicable to liquid crystal display devices.

The disadvantages and deleterious properties described above with reference to certain materials, devices, methods, and apparatus is not intended to limit the present invention. Indeed, certain features of the invention may include any or all of the materials, devices, methods, and apparatus, without suffering from the disadvantages and deleterious properties so described.

SUMMARY OF THE INVENTION

A feature of an embodiment of the present invention is to provide a novel alignment material useful in liquid crystal alignment films in which a side chain without a photoreactive group is incorporated into the base polymer chain.

In accordance with a feature of an embodiment of the present invention, there are provided alignment materials for use in liquid crystal alignment films. The materials of the invention comprise a repeating unit represented by the following formula 1, or a repeating unit represented by the following formula 1 and at least one repeating unit selected from the structures represented by the following formula 2, wherein the equivalent ratio (or mole ratio) of repeating units having at least one photo-reactive group to repeating units not having a photo-reactive group is 2:8 to 10:0:

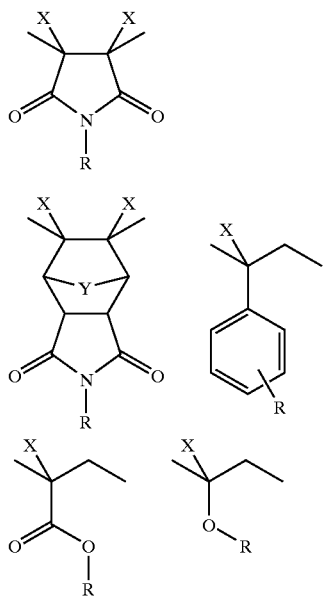

(1)

(2)

in which X is a hydrogen atom, fluorine atom, chlorine atom, or $C_{1\sim14}$ linear or branched alkyl group; Y is an oxygen atom or $C_{2\sim14}$ alkylene group; and R is a functional group having a structure represented by the following formula 3:

(3)

in which $R_1$ is at least one of the functional groups represented by the following formula 4; $R_2$ is at least one of the functional groups represented by the following formulas 5 and 6; $R_3$ is at least one of the functional groups represented by the following formula 7; k is an integer of from 0 to 3; l is an integer of from 0 to 5; and if there exist a plurality of $R_1$ or $R_2$, each $R_1$ or $R_2$ may be same or different:

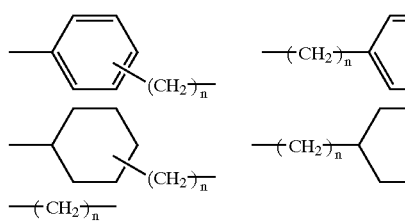

(4)

in which n is an integer of from 0 to 10,

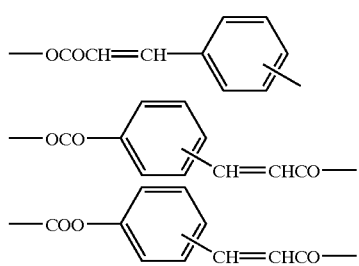

(5)

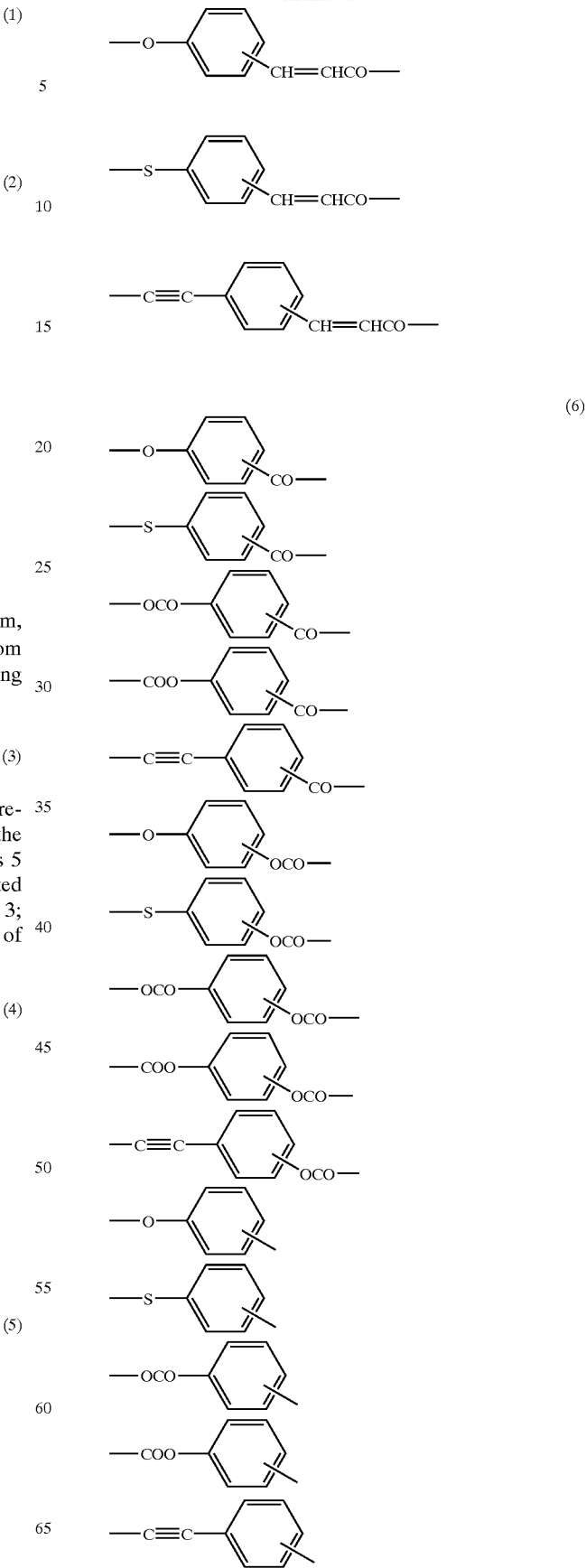

(6)

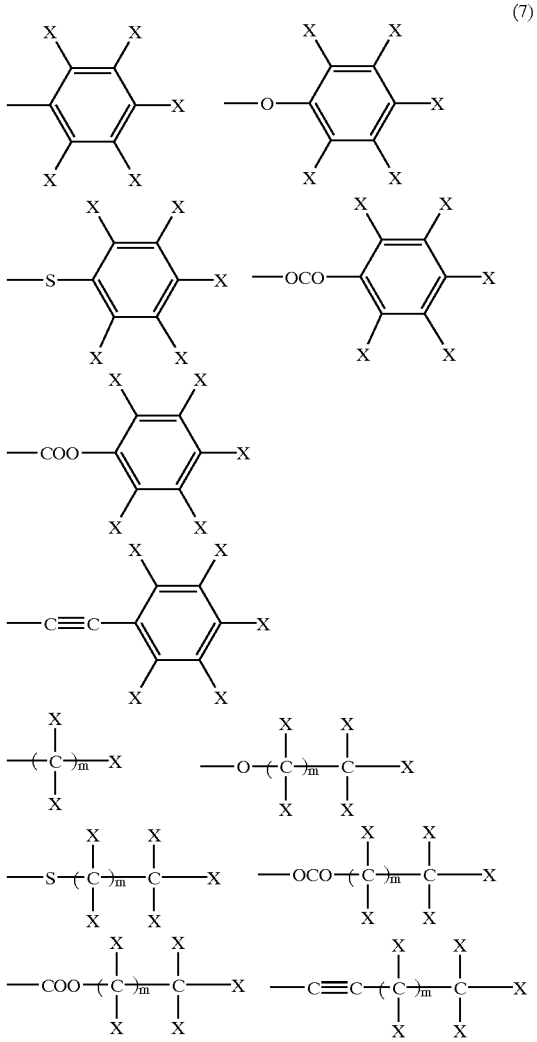

(7)

in which X in the functional groups represented by formula 7 is a hydrogen atom, fluorine atom, chlorine atom, $C_{1\sim13}$ alkyl or alkoxy group, or $-(OCH_2)_pCH_3$ in which p is an integer of from 0 to 12, and m is an integer of from 0 to 18.

DETAILED DESCRIPTION OF THE PREFERRED EMBODIMENTS

Priority Korean Patent Application No. 2001-46313, filed Jul. 31, 2001, is incorporated herein in its entirety by reference.

The photo-alignment material according to the present invention comprises a maleimide-based homopolymer or copolymer. The maleimide-based polymers are excellent in thermal stability compared to polyvinyl alcoholic hydrocarbon-based polymers. It is known that the maleimide type polymers can attain thermal stability at 200° C. or higher, which is a temperature required for manufacture of liquid crystal display devices. Therefore, the present inventors have improved the thermal stability of the alignment film by using an alignment material having a maleimide introduced into main chain thereof.

Also, the present invention is characterized in that among the repeating units comprising the photo-aligning polymeric material, the ratio of repeating units having at least one photo-reactive group to repeating units not having a photo-reactive group preferably is regulated for the purpose of optimizing the electrical properties of an alignment film. That is, improvements in the electrical properties of the alignment film can be attained by incorporating repeating units bearing non-photosensitive groups into the polymer for the photo-alignment material.

Further, the electrical properties of the photo-alignment material according to the present invention can be improved by introducing functional groups such as a fluorine atom, an alkyl group, and the like, which are capable of reducing electrical polarization, into a terminal group of the side chain. Such polymers are excellent in transmittance, insulation capacity and electrooptical properties and hence widely applied to various fields. These features, however, can be disadvantageous for the alignment material. In particular, film formability can be a problem. Film formability properties include coating properties, surface evenness, adhesive strength at an interface, each of which is a critical property of a film for use in a process for manufacturing liquid crystal display devices. In general, the greater the content of such substituentsis, the more the film formability is deteriorated. In the present invention, however, the content of these substituents and their substitution position are optimized to overcome the above-described problems. In addition, when polymers having high substitution rates of fluorine atoms and alkyl groups are used in forming a liquid crystal alignment film, the surface energy of the alignment film may decrease. This is especially true when the alkyl group and fluorine atom are positioned at the outer portion of the side chain, which can increase the pretilt angle of the film unnecessarily. Such an alignment film usually can not be used in manufacturing a typical TN mode liquid crystal display device. Thus, the present invention is designed to minimize the above-described phenomena.

Therefore, the alignment material of the present invention having the above-described features preferably includes a polymer or homopolymer comprising a repeating unit represented by the following formula 1, or a polymer or copolymer comprising a repeating unit represented by the following formula 1 and at least one repeating unit selected from the structures represented by the following formula 2:

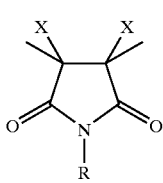

(1)

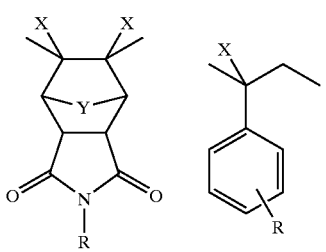

(2)

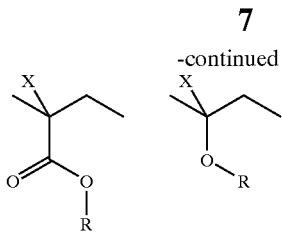

-continued

in which X is a hydrogen atom, fluorine atom, chlorine atom, or $C_{1\sim14}$ linear or branched alkyl group; Y is an oxygen atom or $C_{2\sim14}$ alkylene group; and R is a functional group having a structure represented by the following formula 3:

 (3)

in which $R_1$ is at least one of the functional groups represented by the following formula 4; $R_2$ is at least one of the functional groups represented by the following formulas 5 and 6; $R_3$ is at least one of the functional groups represented by the following formula 7; k is an integer of from 0 to 3; l is an integer of from 0 to 5; and if there exist a plurality of $R_1$ or $R_2$, each $R_1$ or $R_2$ may be same or different:

(4)

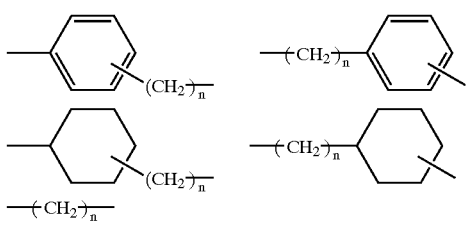

in which n is an integer of from 0 to 10, (5)

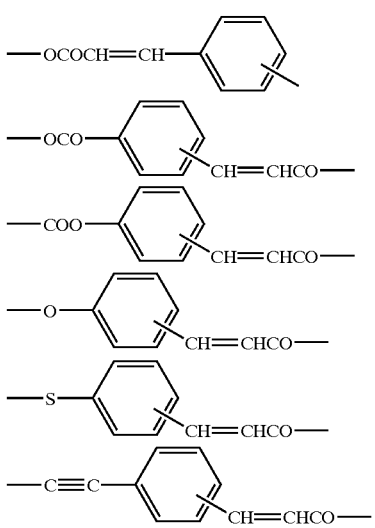

(6)

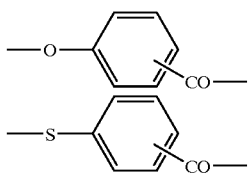

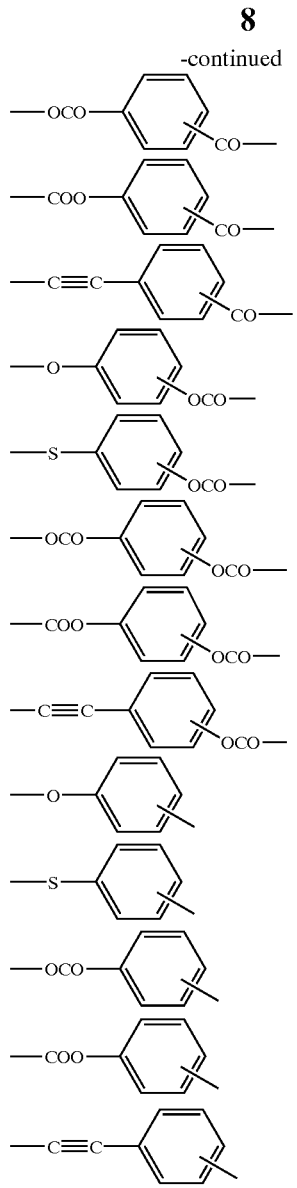

(7)

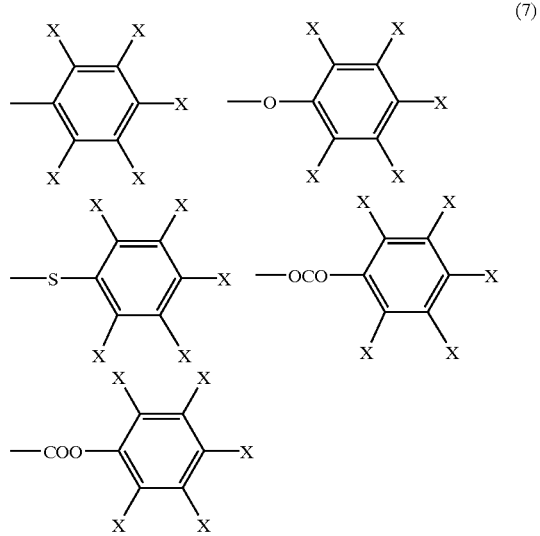

-continued

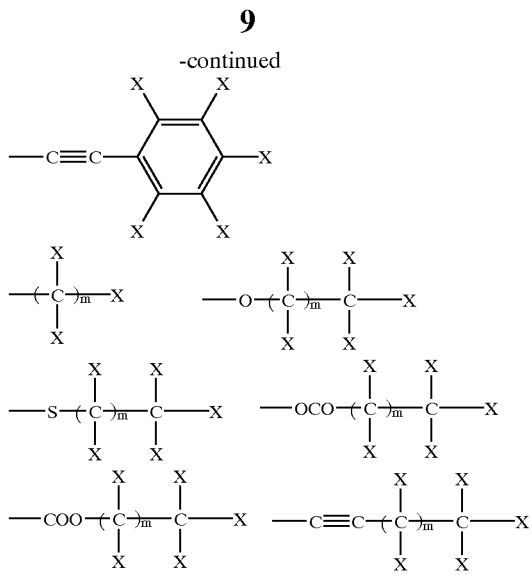

in which X in the functional groups represented by formula (7) is a hydrogen atom, fluorine atom, chlorine atom, $C_{1-13}$ alkyl or alkoxy group, or —$(OCH_2)_pCH_3$ in which p is an integer of from 0 to 12, and m is an integer of from 0 to 18.

As used herein, the term "polymer" encompasses homopolymers, copolymers, terpolymers, tetrapolymers, and other macromers, and is not intended to be limited to any particular number of repeating units. Polymers also may include impurities and additives in addition to the repeating units described herein.

The side chains that are attached to the main polymeric structure of the alignment material according to the present invention preferably are divided into two types. The first type contains at least one photo-reactive group selected from the functional groups represented by the formula 5, and the second type does not contain the photo-reactive group. As described above, the alignment material of the present invention can attain improved electrical properties by adjusting the ratio of (1) repeating units containing at least one photo-reactive group, to (2) repeating units not containing a photo-reactive group. Thus, according to the present invention, the equivalent ratio (mole ratio) of repeating units having at least one photo-reactive group to repeating units not having a photo-reactive group preferably is maintained to be from about 2:8 to about 10:0, and more preferably from about 4:6 to about 9:1. The equivalent ratio (or mole ratio) of the repeating units containing the photo-reactive group preferably is regulated to be above 20% or more to be capable of orienting the liquid crystals. When the equivalent ratio (mole ratio) of the repeating unit containing the photo-reactive group is less than 20%, the alignment of liquid crystals may be deteriorated and consequently, the polymer may not function as an alignment material.

The structures represented by the formula 7 preferably are terminal groups of the side chain, R, attached to the main chain. According to the present invention, fluorine atom, chlorine atom, alkyl groups and the like are introduced into the structure of the terminal groups to improve the electrical stability and optical properties of the alignment film. Preferably, when at least one substituent X is a fluorine atom, the electrical properties of the alignment film can be improved. Also, according to the present invention, it is possible to synthesize a photo-alignment material showing excellent electrical properties by selecting the type of substituents and controlling the degree and position of substitution. Using the guidelines provided herein, those skilled in the art are capable of designing and synthesizing a suitable photo-alignment material of the invention.

The polymer for the photo-alignment material according to the present invention preferably is dissolved in a solvent and then applied to a thin film transistor (TFT) substrate or color filter substrate in a printing method to form a photo-alignment film instead of the conventional polyimide material made using the rubbing process. Thus, alignment of liquid crystal can be achieved by using an exposing process of polarized ultra violet rays, preferably using a 3 kW mercury lamp instead of using the conventional rubbing process. In this exposure process, the exposure energy typically is from about 200 to about 2,000 $mJ/cm^2$. Generally, when the exposed energy is more than 50 $J/cm^2$, the liquid crystal can be aligned. The irradiation of the ultra violet rays preferably is carried out by an inclined irradiation method, i.e., the ultra violet rays are irradiated onto the surface of the alignment film which is inclined at a given tilt angle, to induce a pretilt angle to the liquid crystal. This procedure corresponds to the process of controlling the strength and number of rubbings in the conventional rubbing process to adjust the pretilt angle.

The present invention now will be described in detail with reference to following examples. These examples however, are intended to illustrate the present invention and should not be construed as limiting the scope of the present invention.

EXAMPLES

Synthesis of a Photo-Alignment Material

Example 1

Synthesis of a Photo-Alignment Material Having the Following Repeating Unit Structure:

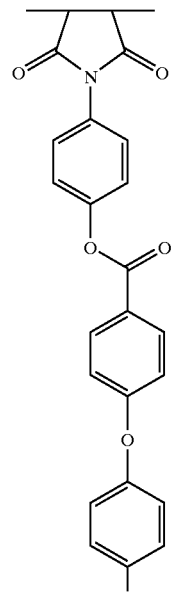

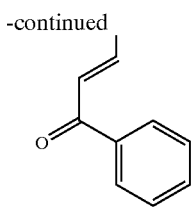

In accordance with the following reaction scheme, 10 g (0.10 mol) of maleic anhydride and 10.1 g (0.09 mol) of aminophenol were added to 100 ml of toluene and stirred for 2 hours at a room temperature to produce an amic acid type intermediate. The resulting solution was added to 100 ml of acetic anhydride and dehydrated with 0.41 g (0.005 mol) of sodium acetate (CH₃COONa) for 4 hours at a temperature of 95° C. to produce 4-acetoxyphenylmaleimide at 50% yield.

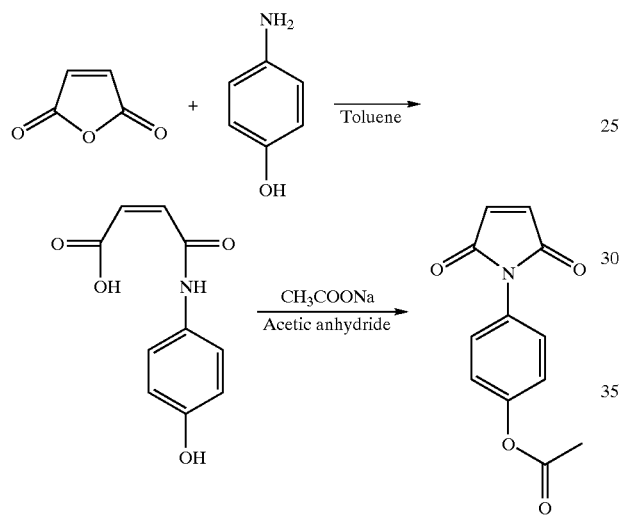

Then, 10 g (0.043 mol) of the above-prepared 4-acetoxyphenylmaleimide was radical-polymerized at a temperature of 65° C. for 4 hours using 0.35 g of AlBN (2,2'-azobisisobutyronitrile) as a polymerization initiator in acetone to form a polymer as follows.

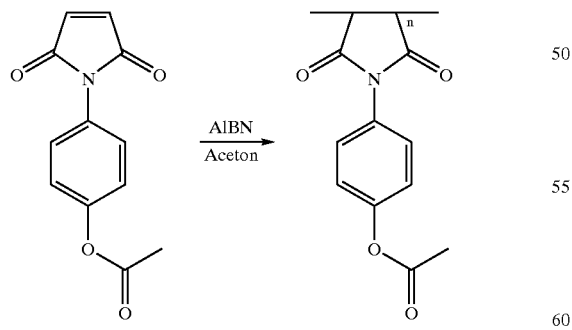

The resulting polymer was deprotected with 5 g of p-toluenesulfonic acid (p-TsOH) in 1 l of a mixture of methanol and acetone at a temperature of 80° C. for 5 hours to produce a polymer having the following structure at 85% yield.

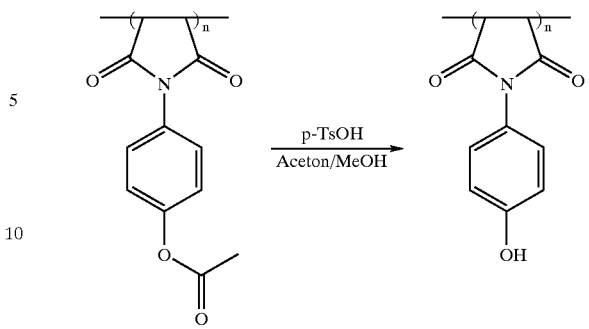

The photo-reactive group of the side chain was synthesized as follows. First, 10.2 g (0.075 mol) of 4-hydroxyacetophenone was dissolved into 0.7 w/v % aqueous solution of NaOH. Benzaldehyde (8 g (0.075 mol)) then was added and the resulting solution was stirred for 8 hours at a room temperature. Then, the solution was neutralized with 5N HCl to yield 4-hydroxychalcone at 50% yield as follows.

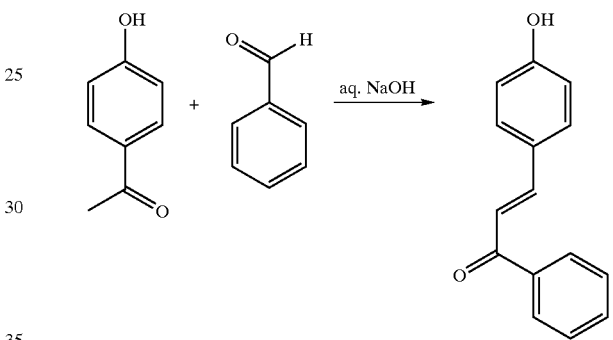

The obtained 4-hydroxychalcone (11.2 g (0.05 mol)) was added to a mixture of 60 ml of dimethyl formamide (DMF) and 60 ml of toluene. To the resulting solution, 8 g (0.06 mol) of K₂CO₃ was added. Then, the solution was refluxed to remove water, followed by addition of 8.3 g (0.05 mol) of 4-fluorobenzoic acid. After refluxing for 24 hours, the desired product was obtained at 40% yield.

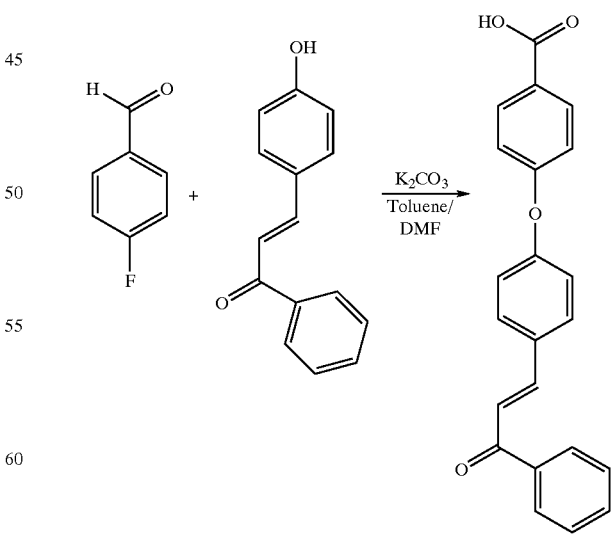

The above-prepared side chain containing the photo-reactive group (2.5 g (0.007 mol)) was acyl chlorinated. The resulting product was dissolved in 20 ml of 1-methyl-2- pyrrolidinone with 1.09 g (0.01 mol) of triethylamine and 1 g (0.003 mol) of the above-prepared polymer and stirred for 1 hour at a room temperature to substitute the side chain into the main chain. Thus, the final photo-alignment material was obtained at 60% yield.

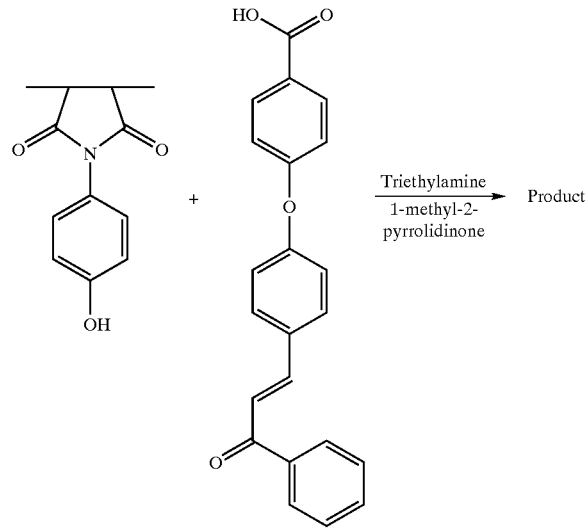

Example 2
Synthesis of a Photo-Alignment Material Having the Following Repeating Unit Structure:

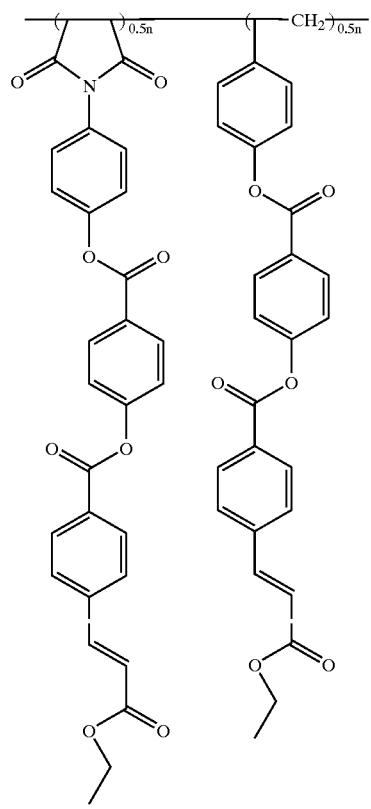

The main chain of the above polymer was synthesized according to the same procedures as described in Example 1. That is, 10 g (0.043 mol) of 4-acetoxyphenylmaleimide, prepared in the same method as described in Example 1, 6.97 g (0.043 mol) of acetoxystyrene, and 0.35 g of AIBN as a polymerization initiator were added to acetone and radical-polymerized at a temperature of 65° C. for 4 hours to form a polymeric chain as follows.

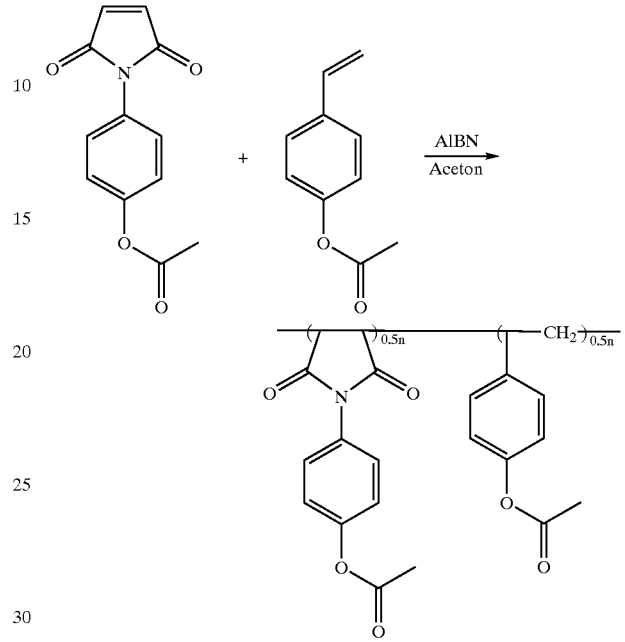

The resulting polymer was deprotected with 5 g of p-toluenesulfonic acid in 1 l of a mixture of methanol and acetone at a temperature of 80° C. for 5 hours to produce a polymeric main chain having the following structure at 85% yield.

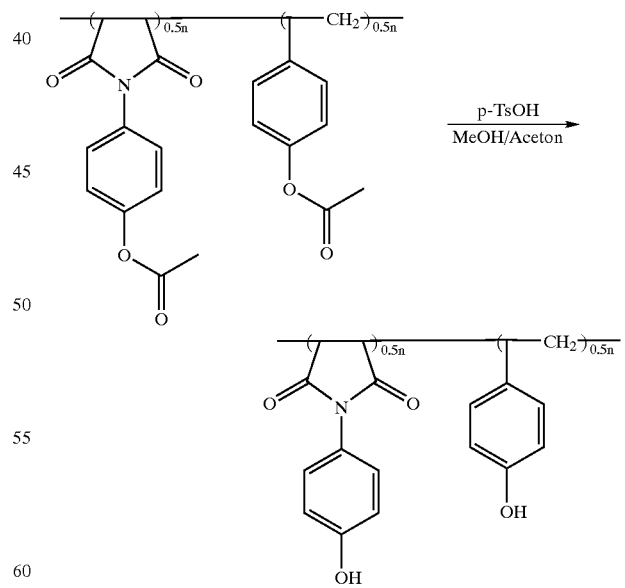

The reactive group of the side chain was synthesized as follows. First, 1 g (0.006 mol) of 4-carboxybenzaldehyde was reacted with 0.79 g (0.006 mol) of thionyl chloride (SOCl$_3$) in dichloromethane for 40 minutes and then reacted with 0.79 g (0.006 mol) of ethylmalonate in 50 ml of pyridine at a room temperature for 3 hours. The product was subsequently subjected to the acyl-chlorination to produce an intermediate of ethyl-trans-chlorocarbonyl cinnamate at 50% yield. This intermediate was reacted with 0.98 g (0.006 mol) of 4-hydroxybenzoic acid and aqueous NaOH/DMSO (dimethyl sulfoxide) solution at a room temperature for 2 hours to yield the photo-reactive group as follows at 60% yield.

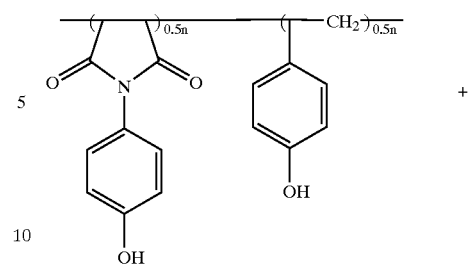

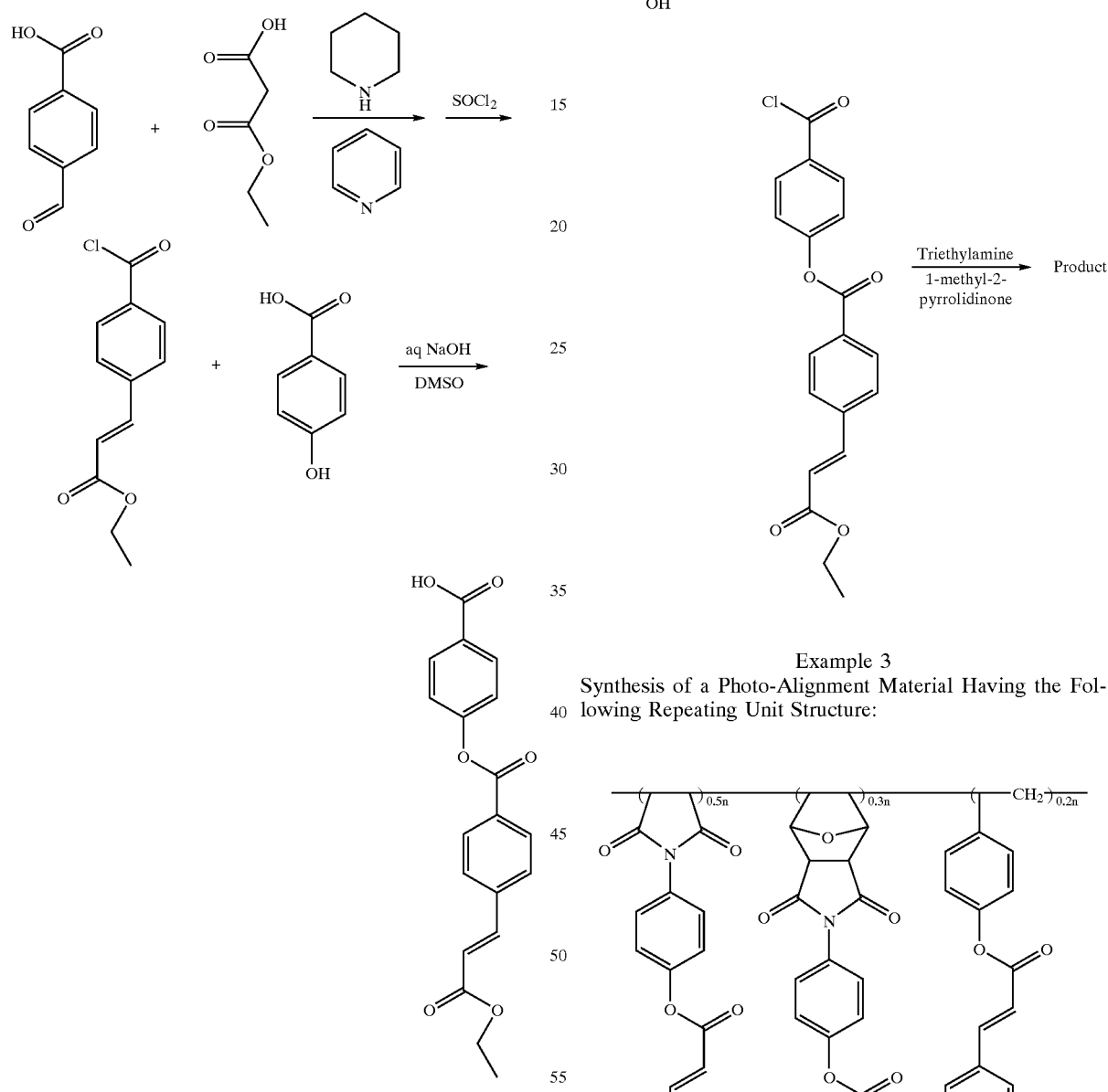

The above-prepared side chain containing the photo-reactive group (2.5 g (0.007 mol)) was acyl-chlorinated. The resulting product was dissolved in 20 ml of 1-methyl-2-pyrrolidinone with 1.09 g (0.01 mol) of triethylamine and 1 g (0.003 mol) of the above-prepared polymer and stirred for 1 hour at a room temperature to substitute the side chain into the polymer main chain. Thus, final photo-alignment material was obtained at 60% yield.

Example 3
Synthesis of a Photo-Alignment Material Having the Following Repeating Unit Structure:

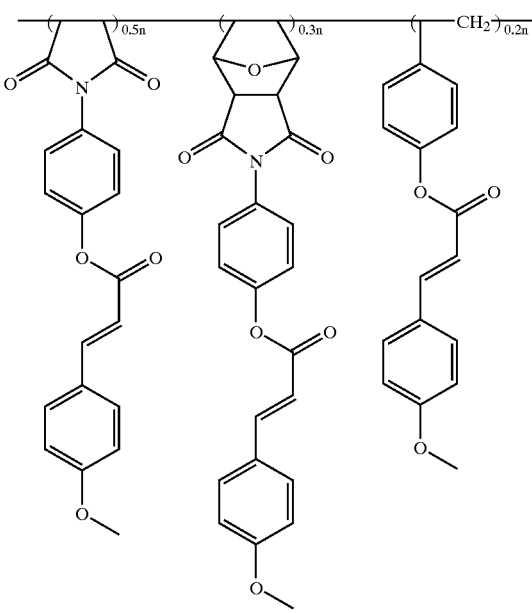

In accordance with the following reaction scheme, 10 g (0.06 mol) of exo-3,6-epoxy-1,2,3,6-tetrahydrophtalic anhydride and 6.73 g (0.06 mol) of amino phenol were added to 100 ml of toluene and stirred for 2 hours at a room temperature to produce an amic type intermediate. The resulting solution was dehydrated with 2.46 g (0.03 mol) of sodium acetate in 100 ml of acetic anhydride for 4 hours at a temperature of 95° C. to yield 4-acetoxyphenyl-3,6-epoxy-1,2,3,6-tetrahydrophtalic imide at 50% yield.

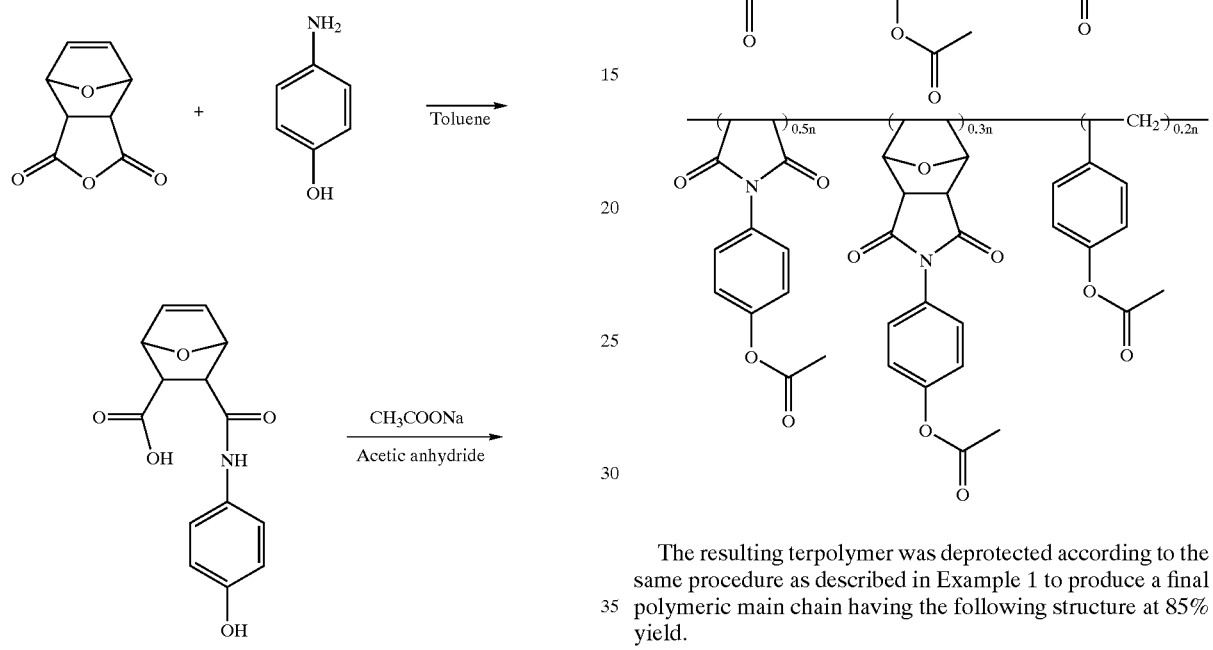

Then, 10 g (0.043 mol) of 4-acetoxyphenylmaleimide monomer, prepared in the same method as described in Example 1, 7.8 g (0.03 mol) of 4-acetoxyphenyl-3,6-epoxy-1,2,3,6-tetrahydrophtalic imide, 2.75 g (0.02 mol) of acetoxystyrene and 0.71 g of AIBN as a polymerization initiator were added to acetone and radical-polymerized at a temperature of 65° C. for 4 hours to form a terpolymer as follows.

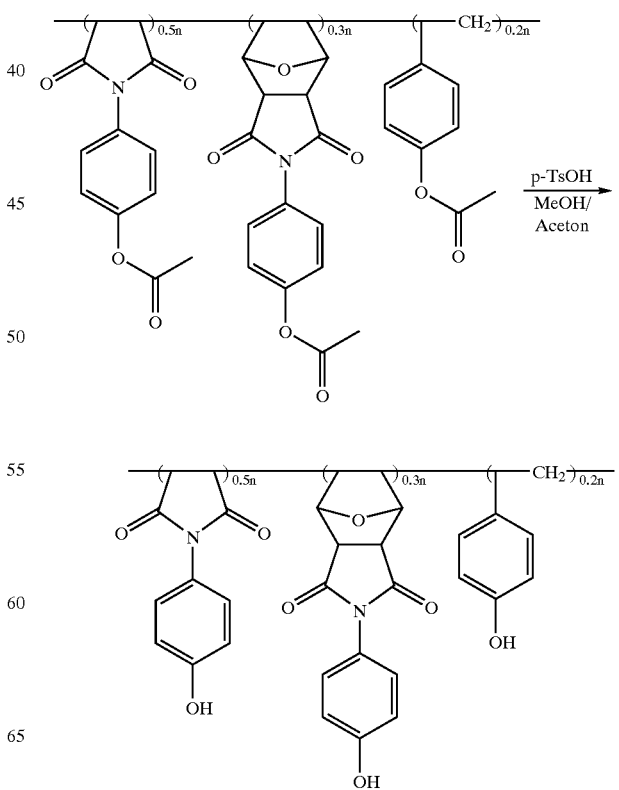

The resulting terpolymer was deprotected according to the same procedure as described in Example 1 to produce a final polymeric main chain having the following structure at 85% yield.

Then, 5 g (0.013 mol) of the polymer main chain was dissolved in 50 ml 1-methyl-2-pyrrolidinone with 4.7 g (0.468 mol) of triethylamine and 6.1 g (0.03 mol) of 4-methoxycinnamoylchloride and stirred for 1 hour at a room temperature to substitute the side chain into the polymer main chain. Thus, the final photo-alignment material was obtained at yield 60%.

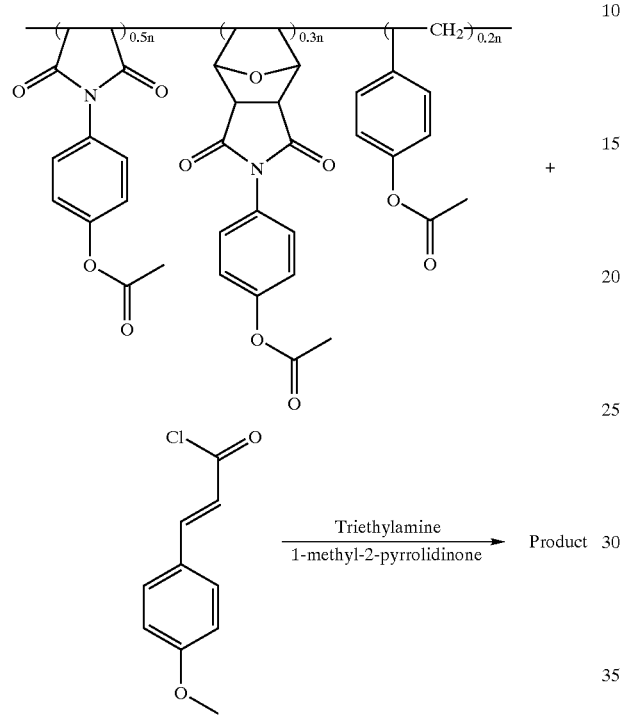

Example 4
Synthesis of a Photo-Alignment Material Having the Following Repeating Unit Structure:

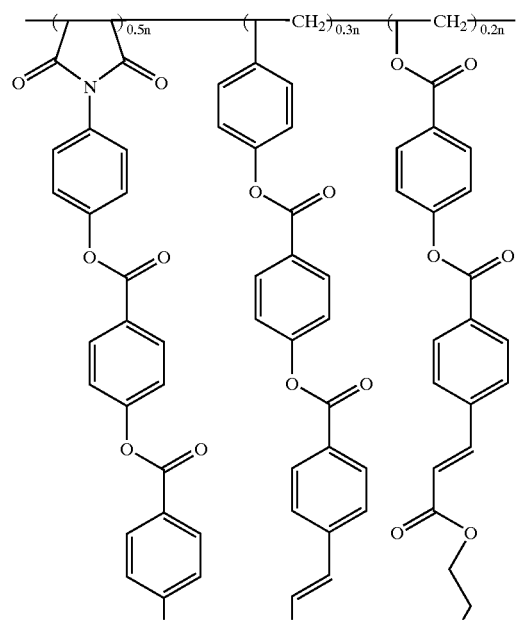

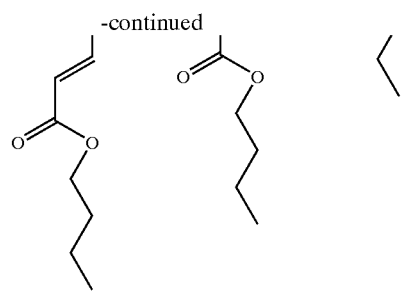

In accordance with the following reaction scheme, 10 g (0.043 mol) of 4-acetoxyphenylmaleimide, prepared according to the same procedures as described in Example 1, 4.2 g (0.025 mol) of acetoxystyrene, 1.43 g (0.016 mol) of vinyl acetate and 0.35 g of AIBN as a polymerization initiator were added to acetone and radical-polymerized at a temperature of 65° C. for 4 hours to form a terpolymer as follows.

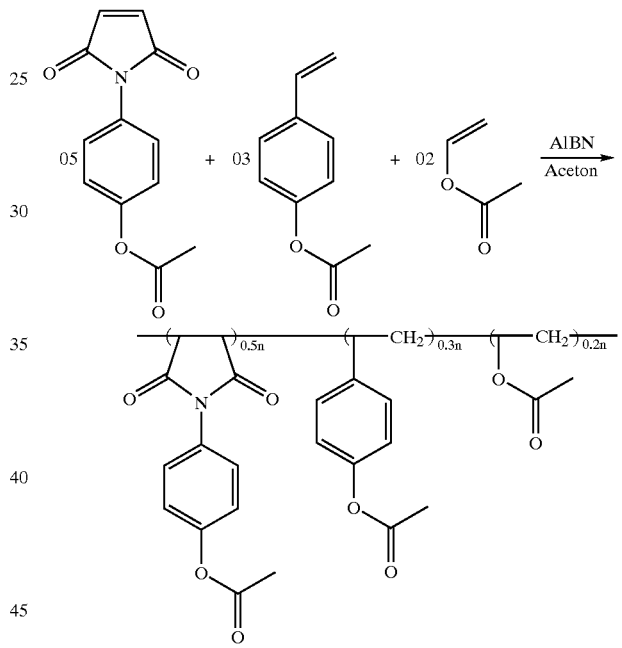

The resulting terpolymer was deprotected with 5 g of p-toluenesulfonic acid in a 1 l of mixture of methanol and acetone at a temperature of 80° C. for 5 hours to produce a polymer having the following structure at 85% yield.

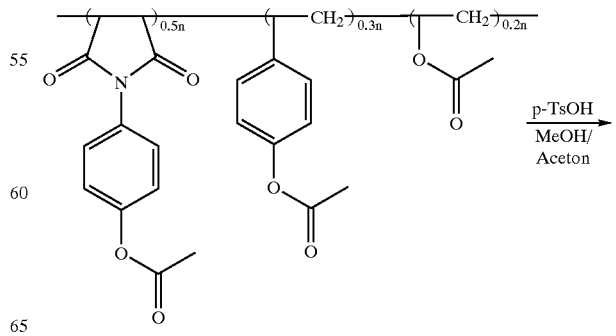

-continued

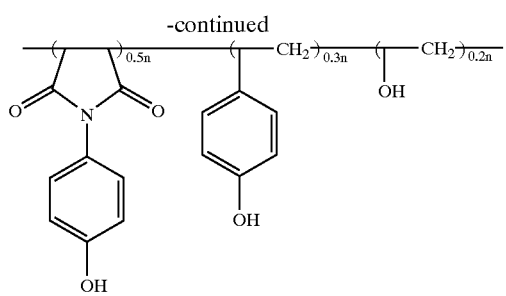

Then, 1 g (0.007 mol) of the above-prepared polymer main chain was dissolved in 50 ml 1-methyl-2-pyrrolidinone. Triethylamine (2.54 g (0.025 mol)) and 5.8 g (0.017 mol) of the side chain, prepared in the same method as described in Example 2 were added to the solution and stirred for 1 hour at a room temperature to substitute the side chain to the polymer main chain. Thus, the final photo-alignment material was obtained at 60% yield.

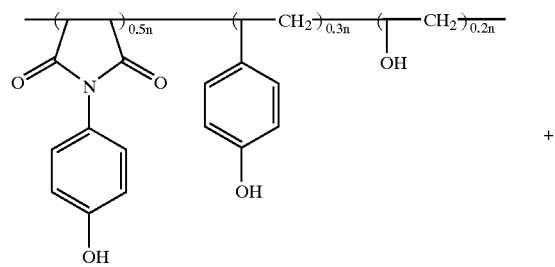

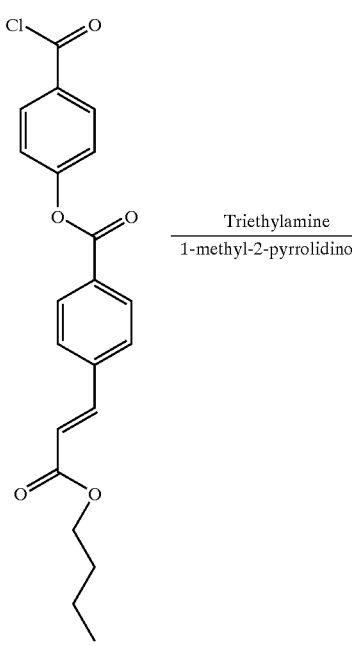

Example 5
Synthesis of a Photo-Alignment Material Having the Following Repeating Unit Structure:

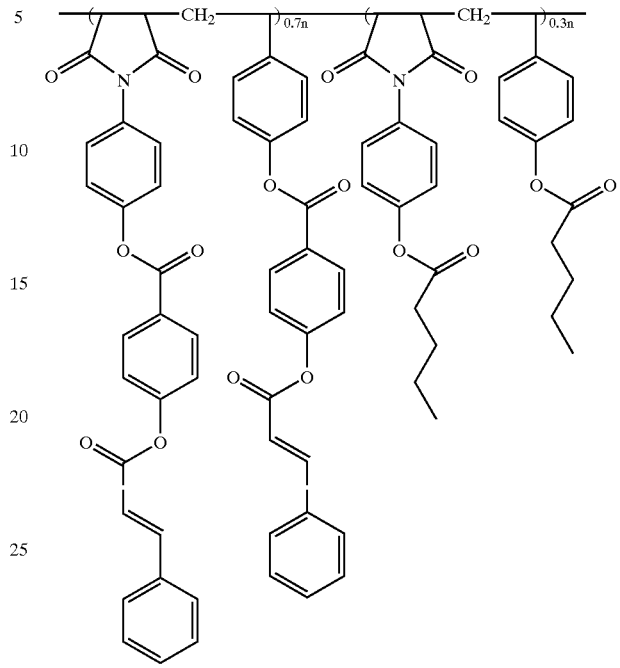

The polymeric main chain having the above repeating structure was synthesized according to the same procedures as described in Example 1. The side chain was synthesized as follows. First, 1 g (0.006 mol) of cinnamic acid was reacted with 0.71 g (0.006 mol) of thionyl chloride in dichloromethane at a temperature of 35° C. for 1 hour to form cinnamoyl chloride. Then, the cinnamoyl chloride was reacted with 0.98 g (0.006 mol) of 4-hydroxybenzoic acid and an aqueous solution of NaOH/DMSO with stirring for 1 hour at a room temperature. The product was again reacted with thionyl chloride in

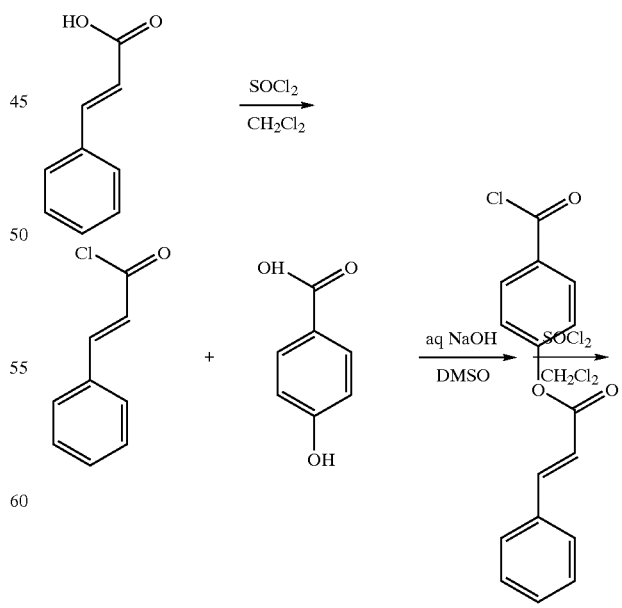

dichloromethane to form a side chain as follows.

The obtained side chain (1.5 g (0.005 mol)) and 0.24 g (0.002 mol) of valeryl chloride were substituted to 1 g (0.003 mol) of the polymer main chain in the ratio of 7:3. Thus, the final photo-alignment material was obtained at 60% yield.

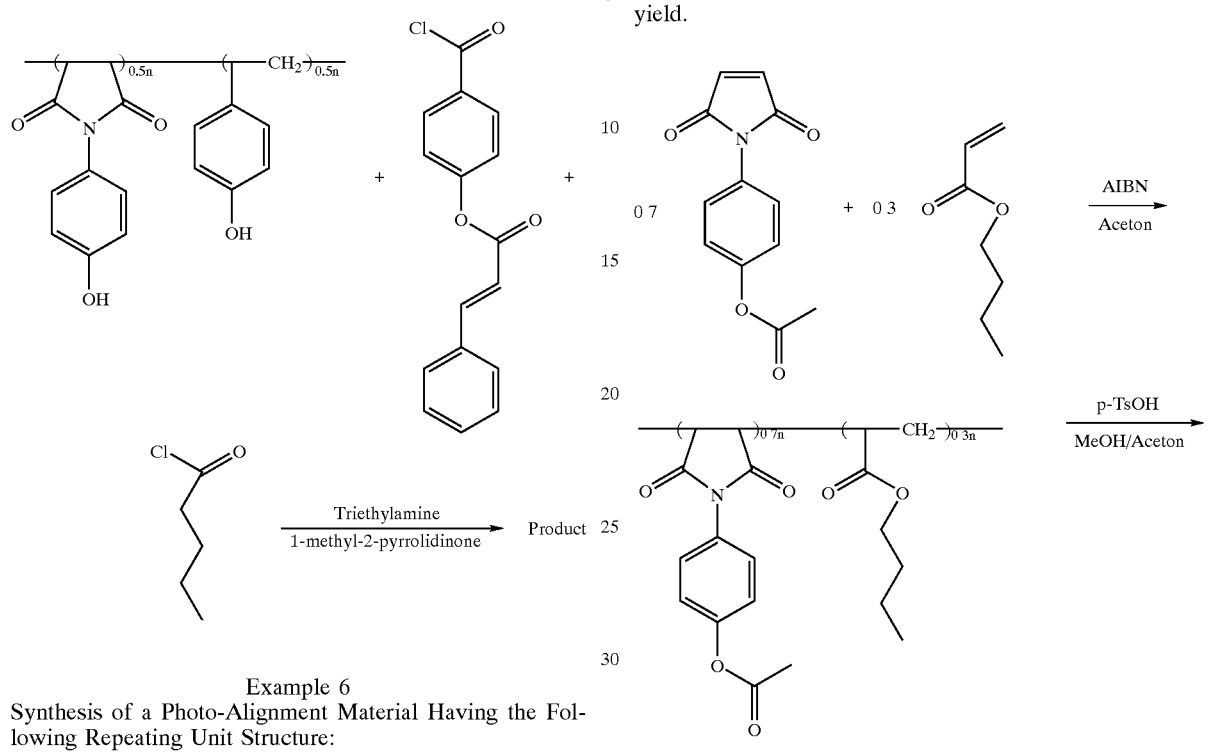

Example 6
Synthesis of a Photo-Alignment Material Having the Following Repeating Unit Structure:

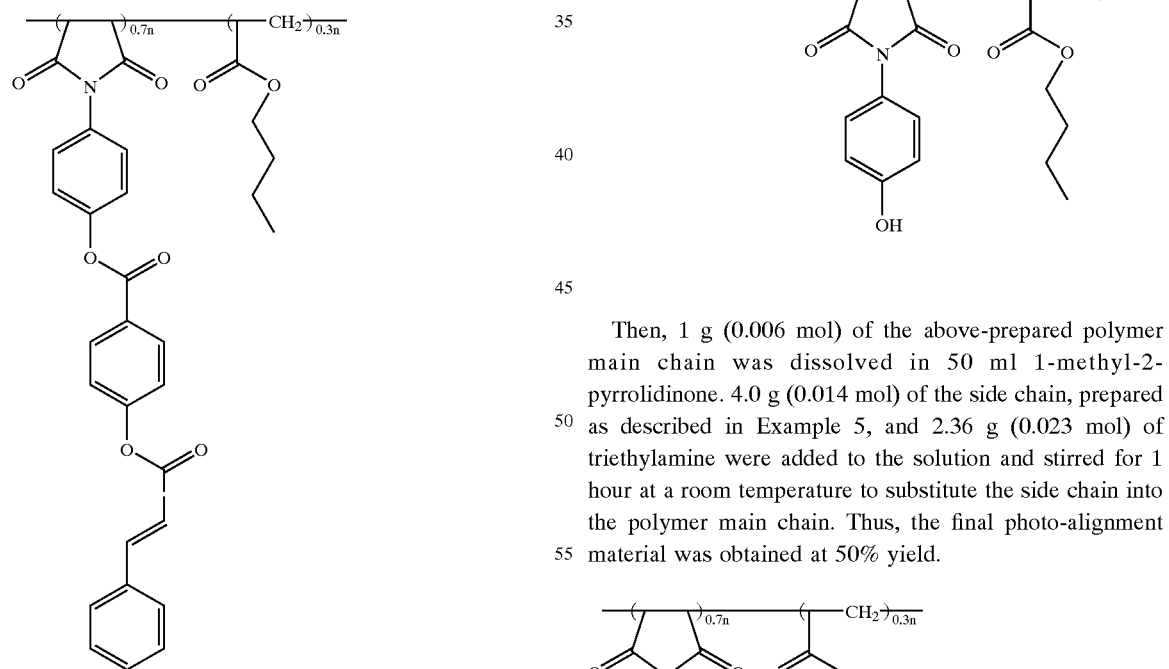

In accordance with the following reaction scheme, 10 g (0.043 mol) of 4-acetoxyphenylmaleimide, prepared according to the same method as described in Example 1, 2.31 g (0.018 mol) of n-butylacrylate and 0.35 g of AIBN as a polymerization initiator were added to acetone and radical-polymerized at a temperature of 65° C. for 4 hours to form a terpolymer. The resulting terpolymer was deprotected with 5 g of p-toluenesulfonic acid in a 1 l of mixture of methanol and acetone at a temperature of 80° C. for 5 hours to produce a polymer main chain having the following structure at 85% yield.

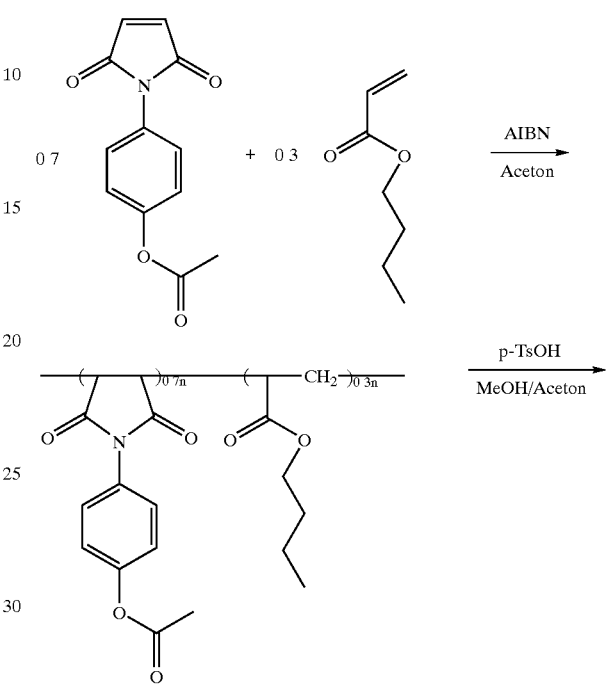

Then, 1 g (0.006 mol) of the above-prepared polymer main chain was dissolved in 50 ml 1-methyl-2-pyrrolidinone. 4.0 g (0.014 mol) of the side chain, prepared as described in Example 5, and 2.36 g (0.023 mol) of triethylamine were added to the solution and stirred for 1 hour at a room temperature to substitute the side chain into the polymer main chain. Thus, the final photo-alignment material was obtained at 50% yield.

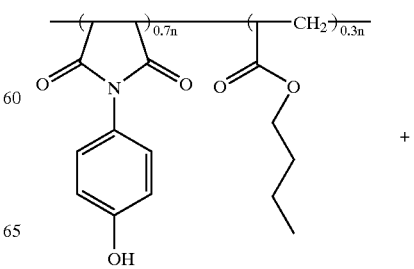

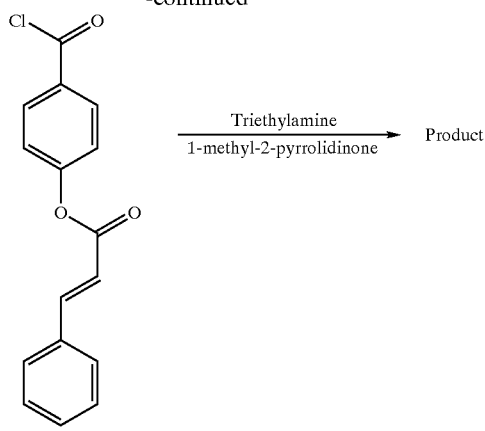

Example 7

Synthesis of a Photo-Alignment Material Having the Following Repeating Unit Structure:

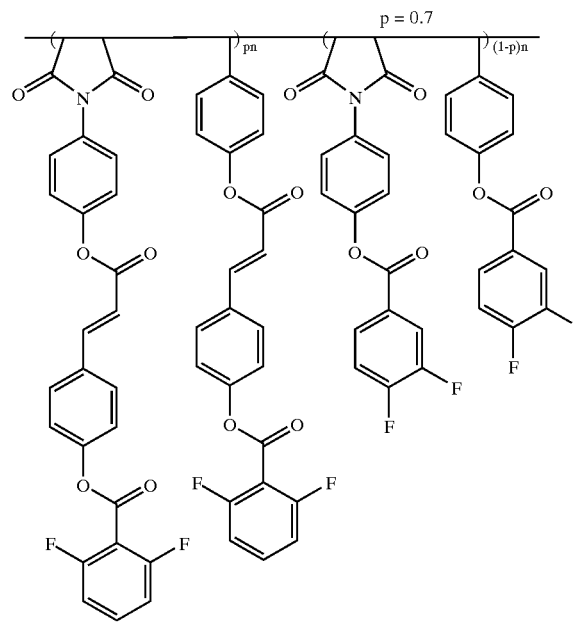

The main chain of the above polymer was synthesized according to the same procedures as described in Example 1.

The side chain was synthesized as follows. First, 50 g (0.3 mol) of 4-hydroxycinnamic acid was dissolved in a 0.25 w/v % aqueous solution of NaOH. To the solution, DMSO and 53.7 g (0.3 mol) of 2,6-difluorobenzoyl cholride were added. After stirring for 1 hour at a room temperature, the solution was neutralized with 4N HCl solution to give the desired product, 2,6-difluorobenzoxy-4,4'-cinnamoyl chloride as follows.

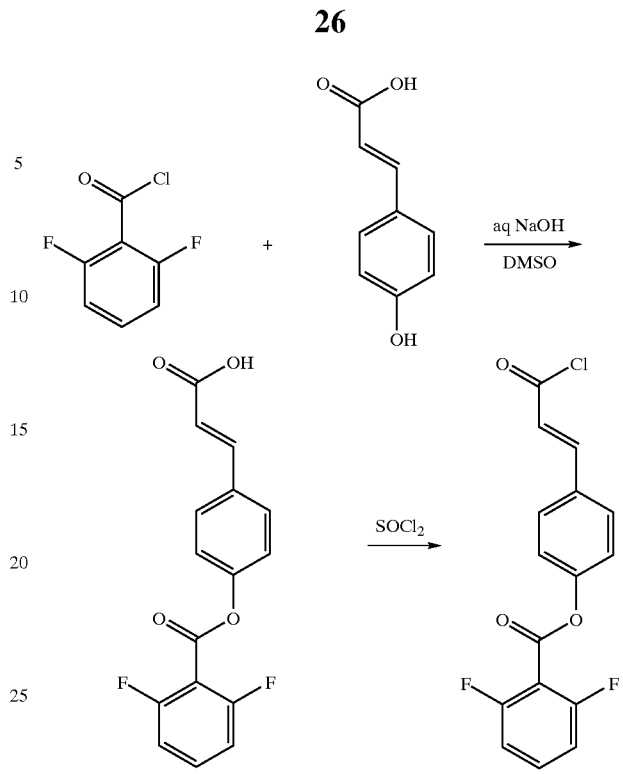

Approximately 0.7 equivalent (17 g, 0.055 mol) of 2,6-difluorobenzoxy-4,4'-cinnamoyl chloride, 0.3 equivalent (7.3 g, 0.02 mol) of 3,4-difluorocinnamoyl chloride and 10.2 g (0.032 mol) of poly(4-hydroxyphenylmaleimide-alt-4-hydroxystyrene) were added to 20 ml of 1-methyl-2-pyrrolidinone, and then 0.91 g (0.009 mol) of triethylamine was added. The substitution reaction of the side chains to the polymer main chain was carried out by stirring the solution for 1 hour at a room temperature. Thus, the final photo-alignment material was obtained at 60% yield.

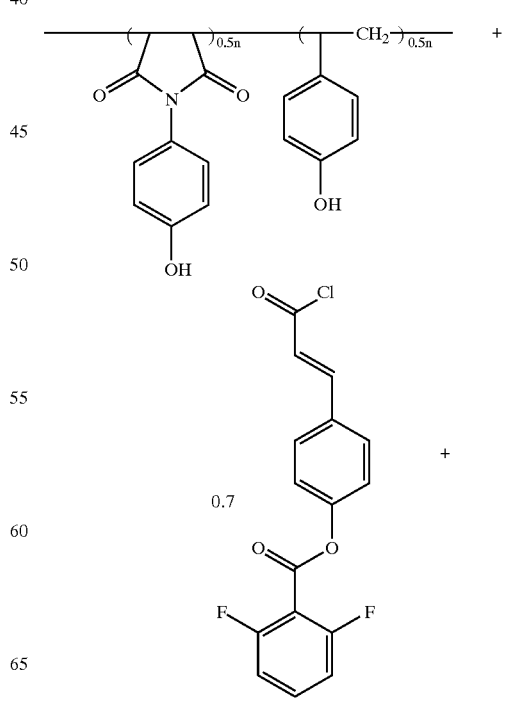

-continued

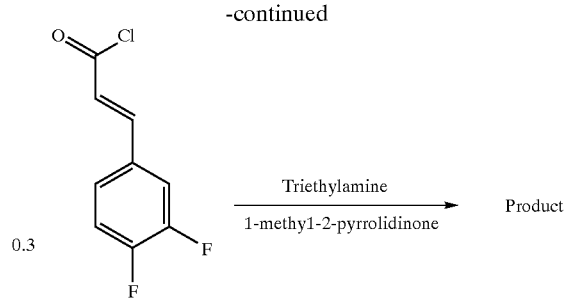

Preparation of Liquid Crystal Display Devices and Properties Assessment of the Liquid Crystal Display Devices The respective photo-alignment materials prepared in the above Examples were dissolved in a mixture of 1-methyl-2-pyrrolidinone and 2-butoxyethanol. The resulting solutions of the respective photo-alignment materials were coated on TFT substrates and color filter substrates by a printing method to form photo-alignment films. These films then were subjected to an exposing process with polarized ultra violet rays using a 3 kW mercury lamp. Fifteen inch (15") liquid crystal display devices were prepared according to the well-known process commonly used for manufacturing a liquid crystal display device. The entire procedure, except for the above exposing process to orient the liquid crystals, was carried out by commonly used processes for manufacturing liquid crystal display devices. The prepared respective liquid crystal display devices then were examined for their electrooptical properties, such as contrast ratio, response time, viewing angle and brightness. The Results are shown in Table 3.

In addition, 1" unit cells were prepared using the respective photo-alignment materials from the above Examples and then measured for voltage holding ratio and residual DC. The results are shown in Tables 1 and 2. The residual DC was measured repeatedly by applying voltages varied from −20V to +20V to each unit cell. In each case, liquid crystals for TN mode TFT-LCD, supplied by Merck (NJ, USA) were used.

Comparative Example 1

Using polyimide (SE 7992, supplied by Nissan Chemicals, JP) which is widely used as a alignment material, a 15" liquid crystal display device and 1" unit cell were prepared according to the same method as described in the above inventive examples. Their electrooptical properties, and voltage holding ratio and residual DC were measured and are shown in Tables 1 to 3.

Comparative Example 2

Using the photo-alignment material having the following molecular structure, as disclosed in Korean Patent Laid-open Publication No. 2000-8633, a 15" liquid crystal display device and 1" unit cell were prepared according to the same method as described in the above inventive examples. Their electrooptical properties, and voltage holding ratio and residual DC were measured and are shown in Tables 1 to 3.

TABLE 1

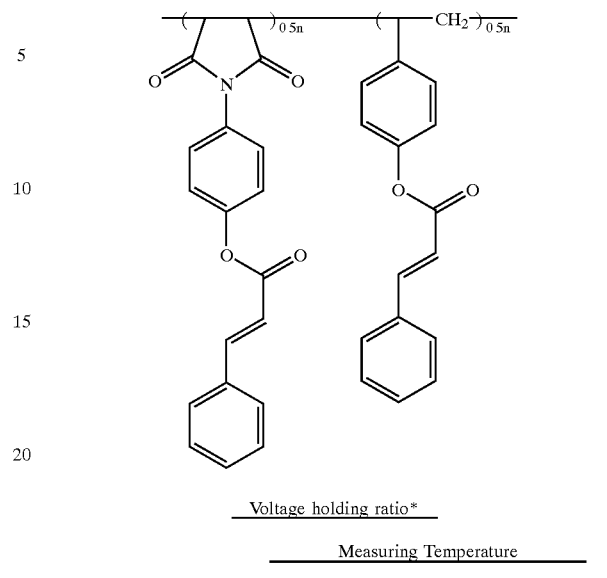

Voltage holding ratio*

| | Measuring Temperature | |
|---|---|---|
| | Room temperature (25° C.) | 60° C. |
| Example 1 | 97.9% | 95.5% |
| Example 2 | 98.3% | 94.5% |
| Example 3 | 98.8% | 95.1% |
| Example 4 | 99.5% | 97.7% |
| Example 5 | 99.1% | 96.1% |
| Example 6 | 99.2% | 97.3% |
| Example 7 | 99.8% | 98.4% |
| Comp. Example 1 | 99.1% | 95.2% |
| Comp. Example 2 | 97.5% | 92.4% |

*The voltage holding ratio was measured under the condition of 1V for 64 μs, with a frequency of 60 Hz.

TABLE 2

Residual DC*

| | Max. ΔC |
|---|---|
| Example 1 | $21.7 \times 10^{-9}$ F |
| Example 2 | $17.0 \times 10^{-9}$ F |
| Example 3 | $8.9 \times 10^{-9}$ F |
| Example 4 | $5.4 \times 10^{-9}$ F |
| Example 5 | $6.2 \times 10^{-9}$ F |
| Example 6 | $5.6 \times 10^{-9}$ F |
| Example 7 | $4.3 \times 10^{-9}$ F |
| Comp. Example 1 | $31.2 \times 10^{-9}$ F |
| Comp. Example 2 | $55.2 \times 10^{-9}$ F |

*The residual DC was relatively estimated by comparing the point at which the difference of electric capacitances (ΔC) at the same voltage was at a maximum.

TABLE 3

Electrooptical properties of 15" TFT LCD

| | Contrast ratio* | Response time (msec) | Brightness* (cd/m²) | Viewing angle | |
|---|---|---|---|---|---|
| | | | | Right/Left | Top/Bottom |
| Example 1 | 247 | 32 | 195 | 58/58 | 45/>60 |
| Example 2 | 205 | 29 | 201 | 59/58 | 451>60 |
| Example 3 | 212 | 25 | 207 | 58/58 | 45/>60 |
| Example 4 | 225 | 27 | 205 | 59/58 | 45/>60 |
| Example 5 | 224 | 29 | 211 | 58/58 | 45/>60 |

TABLE 3-continued

Electrooptical properties of 15" TFT LCD

|  | Contrast ratio* | Response time (msec) | Brightness* (cd/m$^2$) | Viewing angle Right/Left | Viewing angle Top/Bottom |
|---|---|---|---|---|---|
| Example 6 | 218 | 26 | 208 | 59/58 | 45/>60 |
| Example 7 | 237 | 26 | 210 | 58/59 | 45/>60 |
| Comp. Example 1 | 200 | 35 | 200 | 58/58 | 45/>60 |
| Comp. Example 2 | 185 | 32 | 205 | 58/59 | 45/>60 |

*The contrast ratio and brightness are reported as average values of measurements taken at 9 different positions on the screen.

From the above Tables 1 and 2, it can be seen that the Examples 1 to 7 according to the present invention showed improvements in voltage holding ratio and residual DC when compared to Comparative Example 2 and thus overcame the problems occurring in the existing photo-alignment material. The voltage holding ratio and residual DC are very important properties in terms of reliability of display quality and electrical stability. Specifically, they are considered, along with the response time, as main factors associated with an image sticking phenomenon that hinders the natural display of moving images. In addition, when compared to Comparative Example 1 using conventional alignment materials, the voltage holding ratio and especially the residual DC was improved.

Therefore, as described above, and in accordance with the present invention, it is possible to provide photo-alignment materials capable of improving the electrical properties over the polyimide type alignment material used in the rubbing process. In practice, as shown in the Examples, the alignment material according to the present invention was observed to be comparable to the alignment material for rubbing process in terms of electrical and electrooptical properties.

While there have been illustrated and described what are considered to be preferred specific embodiments of the present invention, it will be understood by those skilled in the art that the present invention is not limited to the specific embodiments thereof, and that various changes, modifications, and equivalents may be substituted for elements thereof without departing from the true spirit and scope of the present invention.

What is claimed is:
1. A photo-alignment material comprising a repeating unit represented by the following formula 1, or a repeating unit represented by the following formula 1 and at least one repeating unit selected from the group consisting of structures represented by the following formula 2, wherein the photo-alignment material comprises at least one repeating unit having a photo-reactive group selected from the group consisting of functional groups represented by the following formula 5, and the mole ratio of repeating units having at least one photo-reactive group selected from the group consisting of functional groups represented by the following formula 5 to repeating units not having a photo-reactive group is from about 2:8 to about 9:1:

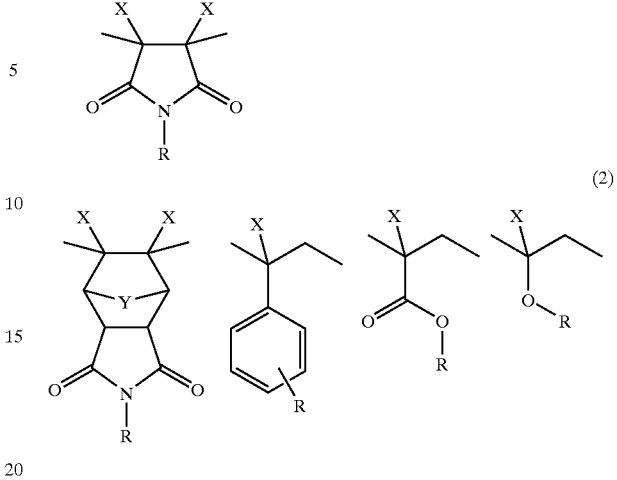

in which X is a hydrogen atom, fluorine atom, chlorine atom, or $C_{1-14}$ linear or branched alkyl group; Y is an oxygen atom or $C_{2-14}$ alkylene group; and R is a functional group having a structure represented by the following formula 3:

in which $R_1$ is selected from the group consisting of functional groups represented by the following formula 4; $R_2$ is selected from the group consisting of functional groups represented by the following formulas 5 and 6; $R_3$ is selected from the group consisting of functional groups represented by the following formula 7; k is an integer of from 0 to 3; l is an integer of from 0 to 5; and if there exist a plurality of $R_1$ or $R_2$, each $R_1$ or $R_2$ may be same or different:

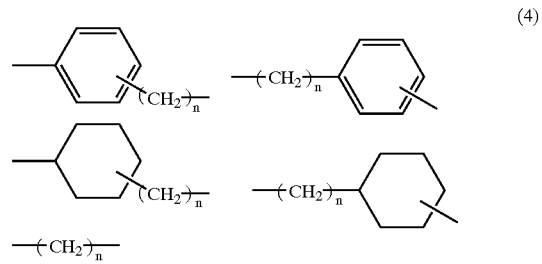

in which n is an integer of from 0 to 10,

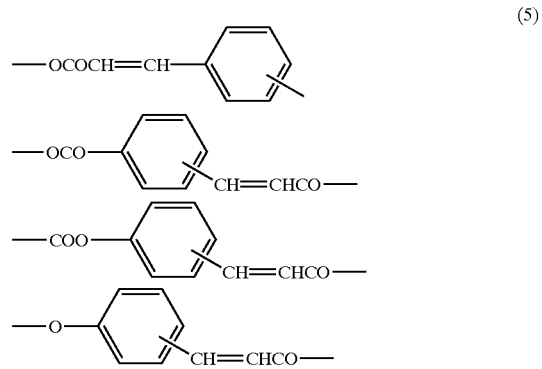

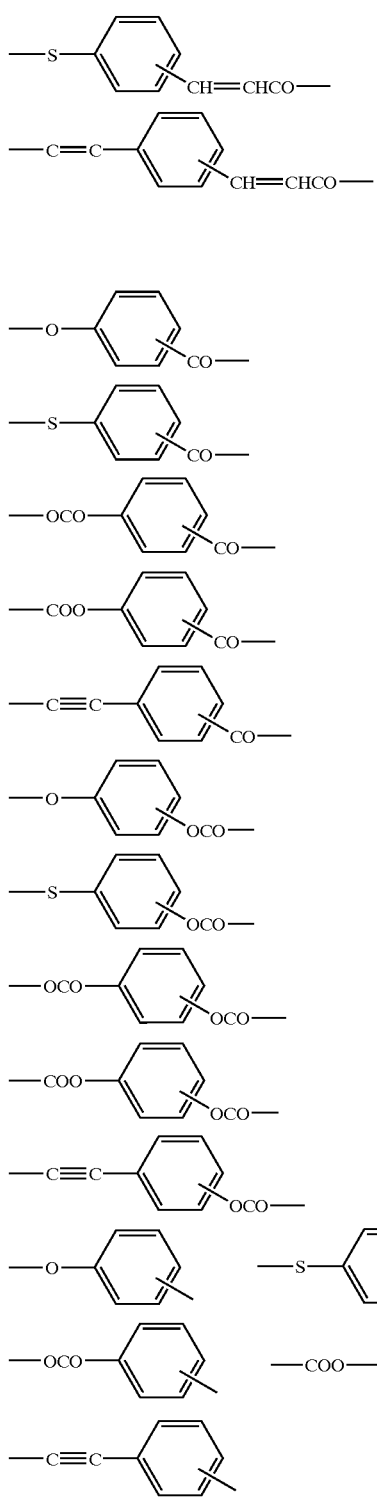

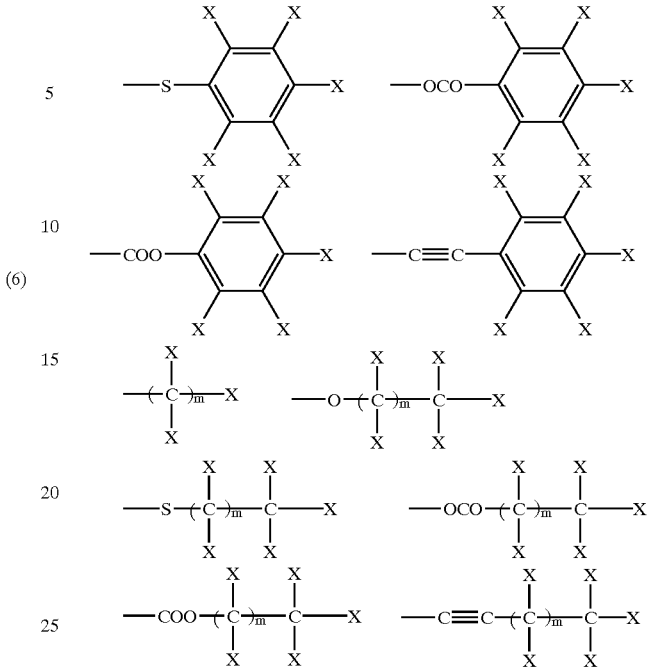

in which X in the functional groups represented by formula (7) is a hydrogen atom, fluorine atom, chlorine atom, $C_{1\sim13}$ alkyl or alkoxy group, or $-(OCH_2)_pCH_3$ in which p is an integer of from 0 to 12, and m is an integer of from 0 to 18.

2. The photo-aligrunent material according to claim 1, wherein the mole ratio of repeating units having at least one photo-reactive group to repeating units not having a photo-reactive group is from about 4:6 to about 9:1.

3. The photo-alignment material according to claim 1, wherein at least one fluorine atom is incorporated within the structure of the terminal group $R_3$ of the side chain.

4. The photo-alignment material according to claim 1, wherein the alignment material comprises maleimide-based repeating unit resented by the formula 1 and styrene-based repeating unit among the repeating units represented by the formula 2.

5. The photo-alignment material according to claim 1, wherein the alignment material comprises a cinnamate group as a photo-reactive group among the functional groups represented by the formula 5.

6. A liquid crystal alignment film comprising the photo-alignment material of claim 1.

* * * * *